US008181599B1

(12) United States Patent
Jeffers

(10) Patent No.: US 8,181,599 B1
(45) Date of Patent: May 22, 2012

(54) LAP PET BED

(76) Inventor: Edwina Dee Jeffers, San Pedro, CA (US)

( * ) Notice: Subject to any disclaimer, the term of this patent is extended or adjusted under 35 U.S.C. 154(b) by 0 days.

(21) Appl. No.: 13/044,389

(22) Filed: Mar. 9, 2011

(51) Int. Cl.
 *A01K 1/035* (2006.01)
(52) U.S. Cl. .......... 119/28.5; D30/118; 297/181; 446/72
(58) Field of Classification Search ................ 119/28.5, 119/526; 5/630, 632, 633, 640, 653; 2/115; 223/111; D30/118; 297/181; 116/22 A; 446/369, 26, 28, 71, 72, 73, 75, 76; *A01K 29/00, A01K 1/015*
See application file for complete search history.

(56) References Cited

U.S. PATENT DOCUMENTS

| 3,840,916 | A | * | 10/1974 | Jennings | ............................. | 5/655 |
| 4,197,604 | A | * | 4/1980 | Nakamura | ......................... | 5/640 |
| 4,197,670 | A | * | 4/1980 | Cox | ............................... | 446/369 |
| D279,727 | S | | 7/1985 | Mitchell | | |
| 4,538,310 | A | * | 9/1985 | Scott | ................................. | 5/655 |
| 4,540,378 | A | | 9/1985 | Cusimano | | |
| 4,759,588 | A | * | 7/1988 | Husnik | ......................... | 297/468 |
| D303,897 | S | | 10/1989 | Phillips | | |
| 4,909,573 | A | * | 3/1990 | Barry et al. | .............. | 297/452.17 |
| D309,199 | S | | 7/1990 | McMahon | | |
| 5,027,457 | A | | 7/1991 | Sweet | | |
| 5,147,109 | A | * | 9/1992 | Jolly | ........................... | 297/217.4 |
| 5,507,551 | A | * | 4/1996 | Barry | ............................. | 297/181 |
| 5,515,545 | A | | 5/1996 | Becton | | |
| D370,585 | S | | 6/1996 | Faithfull | | |
| D377,815 | S | | 2/1997 | Deprima | | |
| 6,305,318 | B1 | | 10/2001 | Ford | | |
| 6,434,769 | B1 | * | 8/2002 | Koenig | .............................. | 5/636 |
| 6,494,532 | B1 | * | 12/2002 | Brosnan et al. | ................ | 297/181 |
| 6,574,810 | B2 | | 6/2003 | Mangiaracina | | |
| D484,348 | S | | 12/2003 | Pappas | | |
| D518,244 | S | | 3/2006 | Babel | | |
| D535,062 | S | | 1/2007 | McGinley | | |
| D563,058 | S | | 2/2008 | Lamstein | | |
| 7,353,552 | B2 | | 4/2008 | Leach | | |
| D577,158 | S | | 9/2008 | Song | | |
| D603,644 | S | | 11/2009 | Ketner | | |
| 7,634,975 | B2 | * | 12/2009 | Kates | ............................ | 119/712 |
| D617,056 | S | | 6/2010 | Zine | | |
| 7,743,442 | B2 | * | 6/2010 | Maloney et al. | ................... | 5/655 |
| D624,248 | S | | 9/2010 | Deitch | | |
| 2007/0101502 | A1 | | 5/2007 | Bierbauer | | |
| 2008/0302308 | A1 | * | 12/2008 | Supino | .......................... | 119/174 |
| 2009/0111354 | A1 | * | 4/2009 | Zheng | .......................... | 446/369 |
| 2011/0030619 | A1 | * | 2/2011 | Blackstone | .................... | 119/527 |

OTHER PUBLICATIONS

Smucci Pet Beds; The Orginal Cat Bowl Bed; internet website printout; http://blogs.dogtime.com. PETCO; Chaise Cat Bed; internet website printout; http://www.petco.com.
Doctors Foster and Smith; Luxury Bolster Bed for Cats;internet website printout; http://www.drsfostersmith.com.
Doctors Foster and Smith; Floppy Nest Cat Bed; internet website printout; http://www.drsfostersmith.com.

* cited by examiner

*Primary Examiner* — Rob Swiatek
*Assistant Examiner* — Kathleen Iwasaki
(74) *Attorney, Agent, or Firm* — Robert J. Lauson; Lauson & Tarver LLP

(57) ABSTRACT

An improved pet bed for a pet such as a small dog or a cat includes a seat cushion for the pet to rest on, much like the owner's lap, and a connected back cushion much like the owner's torso. A pair of arm cushions extend from the back cushion, the arms moveable from a spread-apart open position, and a closed portion where the ends may be locked together. While in the open position the arms may receive a shirt of the pet owner, much like a mannequin. Then the arms may be moved to the closed position, and the small pet inside enjoys the feeling of being held by the pet bed and the scent of the owner's clothing. Advantageously, the shirt may be laundered, worn by the owner and replaced onto the pet bed.

11 Claims, 2 Drawing Sheets

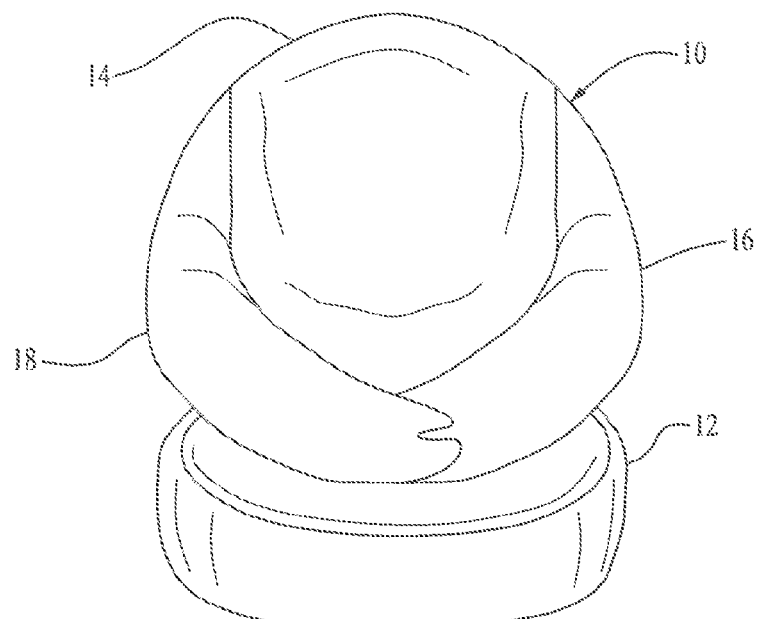
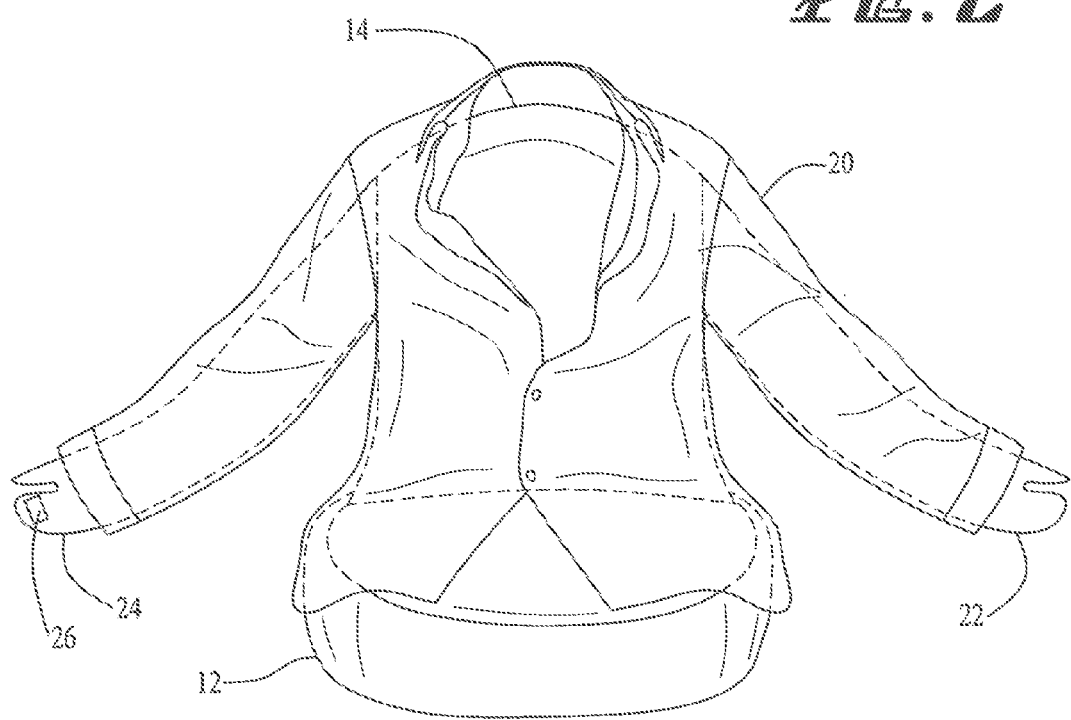

LAP PET BED

BACKGROUND

This invention pertains to an improved pet bed that simulates the owner holding the pet.

Small pets gravitate to the comfort and safety of their owner's lap and being held as the owner watches TV, reads a book, etc. Additionally, when the owner is up and about from the couch, pets often gravitate to the owner's clothing, because the owner's scent found on the clothing is comforting to the pet who has a keen sense of smell. But it looks unsightly to leave piles of clothes laying around for the pet to nest in, to make the pet feel like they are safely in the owner's lap. Pets left alone can become lonely and anxious, misbehaving and damaging articles in the home while the owner is away. And some pet owners become so attached to their small cats and dogs that they suffer guilt when they leave the home. This is a problem as most people today have packed schedules and are unable to spend as much time with their pets as they would like although very attached to their pets.

Accordingly, there exists a need for new products and methods of comforting a pet in the owner's absence, by simulating the experience the pet has in resting on the owner's lap.

SUMMARY

An improved pet bed for a pet such as a small dog or a cat includes a platform seat cushion large enough for the pet to rest on, much like the owner's lap, and an upright back cushion preferably connected to the seat cushion much like the owner's torso. A pair of arm cushions extend from preferably from the back cushion. The arm cushions are moveable from a spread-apart open position, and a closed portion where the ends may preferably be interlocked together. While in the open position the arm cushions may receive a conventional shirt of the pet owner, much like a shirt fits on a mannequin. The shape of the arm cushions may be adjusted, and they may be moved to the closed, interlocked position. Then small pet inside may enjoy the feeling of being held by the pet bed and the scent of the owner's clothing. Advantageously, the shirt may be removed as it becomes soiled by the pet, laundered, worn by the owner and then replaced onto the pet bed.

BRIEF DESCRIPTION OF THE DRAWINGS

FIG. 2 is a perspective view of the improved lap pet bed with the arms articulated to a closed and interlocked position.

FIG. 3 is a perspective view of the improved lap pet bed donning the owner's shirt and the arms in the open position.

DESCRIPTION

Figure 1:
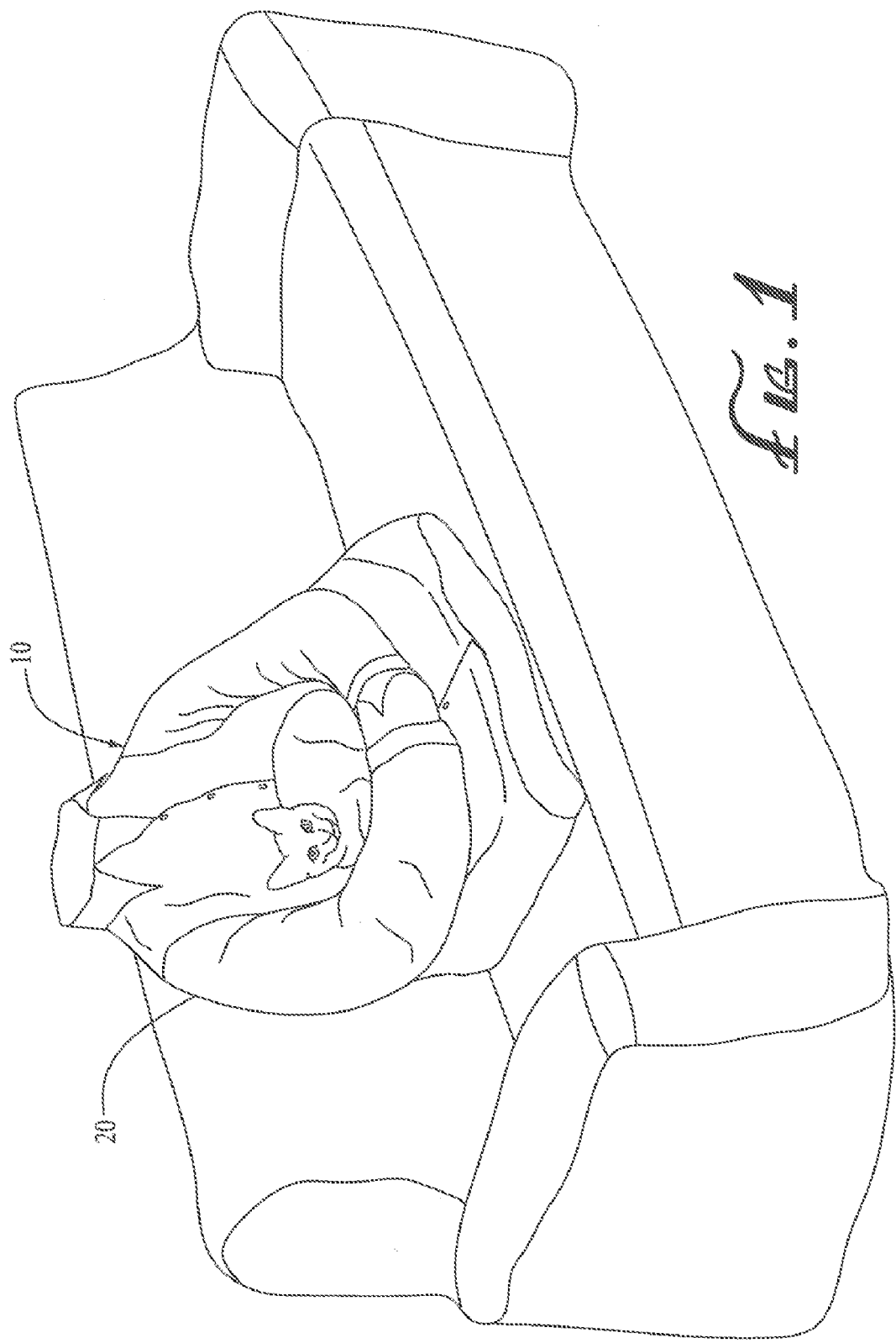
FIG. 1 is a perspective view of an improved lap pet bed on a conventional sofa with the owner's shirt installed therein and occupied by a cat.

Referring to FIGS. 1-3, the preferred embodiment improved pet bed 10 may be described. The pet bed 10 includes a platform seat cushion 12 extending transversely from a bottom edge of an upright back cushion 14 to define a substantially L-shaped contour therewith, and a pair of left and right arm cushions, 16, 18 which extend from shoulder areas defined at opposed upper sides of the upright back cushion offset from the bottom edge. The pet bed is sized for a small dog or cat to sit on the seat cushion 12, and to receive the owner's shirt 20, wrapped around the back 14 of the pet bed 10, and through the arms 16, 18. Preferably the ends 22, 24 of the arms 16, 18 are configured to be interlocked together. Possible fastening means to keep the ends 22, 24 together include conventional Velcro® hook and loop fasteners 26. Importantly, the position and shape of the arms 16, 18 are adjustable, depending upon the size/shape of the pet so that the seat 12 combined with the back cushion 14 and the arms 16, 18 form a custom bed 10, having a nest-like structure that surrounds and contacts the pet.

Having described the structure of the preferred embodiment improved pet bed 10, it is now possible to describe its operation, function and use. By way of example, the arm cushions 16, 18 are moved apart and the owner's shirt 20 installed onto the pet bed 10. Then the arms 16, 18 may be moved back together, bent to a desired shape, and interlocked as desired. Once the small dog or cat is placed into the pet bed, it simulates being held by the owner including the owner's scent as found on the shirt 20. As per FIG. 1, the small pet is primarily in contact with the owner's shirt 20 on the pet bed 10. When the shirt 20 becomes soiled over time, advantageously it may be removed from the pet bed 10 and laundered, worn by the owner for a day to impart his or her smell to the garment 20, and then it can be replaced back onto the pet bed 10.

While the present invention has been described with regards to a particular embodiment, it is recognized that additional variations of the present invention may be devised by persons skilled in the art without departing from the inventive concepts disclosed herein.

What is claimed is:

1. An improved pet bed for a small pet comprising:
    a platform seat cushion sized to receive the small pet;
    an upright back cushion proximate the platform seat cushion, the platform seat cushion extending contiguously along and transversely from substantially the entire length of a bottom edge of the upright back cushion to define a substantially L-shaped contour therewith;
    a pair of flaccid arm cushions hanging in a limp manner from shoulder areas defined at opposed upper sides of the upright back cushion offset from the bottom edge;
    wherein the upright back, platform seat, and arm cushions are configured to cooperatively simulate a pet owner cradling the small pet;
    the arm cushions being adjustable between an open and a closed position;
    the pet bed sized to fully receive a yoke and sleeves of a conventional shirt of the pet owner with the arm cushions in the open position drawn away from and not overhanging the platform seat cushion;
    the arm cushions adjustable to the closed position, configured such that the small pet when placed on the platform seat cushion nests against the upright back cushion and between the pair of arm cushions, the arm cushions in the closed position defining a draped configuration and resting on the platform seat cushion.

2. The improved pet bed of claim 1 wherein the arm cushions extend from outboard sides of the upright back cushion.

3. The improved pet bed of claim 1 wherein the upright back cushion is fixedly connected to the platform seat cushion.

4. The improved pet bed of claim 1 wherein the arm cushions are interlockable together in the closed position.

5. A method of comforting a small pet in an owner's absence, comprising the steps of:
    providing a pet bed having a seat cushion extending contiguously along and transversely from substantially the entire length of a bottom edge of a back cushion to simulate the owner's lap and torso when cradling the small pet, and a pair of moveable flaccid arm cushions extending from the back cushion to simulate the owner's shoulders and hanging in a limp manner therefrom;

moving apart the arm cushions to an open position drawn away from and not overhanging the seat cushion;

donning yoke and sleeves of the owner's shirt onto the pet bed;

placing the small pet in the pet bed; and moving together the arm cushions to a closed position defining a draped configuration and resting on the seat cushion for simulating the owner cradling the small pet.

6. The method of claim 5 including adjusting the shape of the arm cushions.

7. The method of claim 5 further comprising the step of interlocking the arm cushions.

8. The method of claim 5 further comprising the steps of:
removing the small pet from the pet bed;
moving apart the arm cushions; and,
removing the owner's shirt from the pet bed.

9. The method of claim 8 further comprising the steps of:
laundering the owner's shirt; and
the owner wearing the owner's shirt for a day before re-donning onto the pet bed.

10. The improved pet bed of claim 1 wherein the platform seat cushion is formed with a bulbous configuration defining a rounded lateral contour.

11. The method of claim 5 wherein the seat cushion is bulbously configured to define a rounded lateral contour.

* * * * *